United States Patent [19]

Shum et al.

[11] Patent Number: 5,835,770
[45] Date of Patent: Nov. 10, 1998

[54] USER INQUIRY FACILITY FOR TASK STATUS IN A DISTRIBUTED SYSTEM

[75] Inventors: Peter K. L. Shum; Kevin Yan, both of Scarborough; Dean Tai, Toronto, all of Canada

[73] Assignee: International Business Machines Corporation, Armonk, N.Y.

[21] Appl. No.: 202,845

[22] Filed: Feb. 25, 1994

Related U.S. Application Data

[63] Continuation of Ser. No. 708,134, May 30, 1991, abandoned.

[30] Foreign Application Priority Data

Jun. 19, 1990 [CA] Canada ................................. 2019327

[51] Int. Cl.⁶ ................................................. G06F 11/34
[52] U.S. Cl. ................................. 395/704; 379/457
[58] Field of Search ........................... 395/650, 700

[56] References Cited

U.S. PATENT DOCUMENTS

| | | | |
|---|---|---|---|
| 3,701,971 | 10/1972 | Scanner et al. | 340/172.5 |
| 4,858,152 | 8/1989 | Estes et al. | 364/550 |
| 4,887,204 | 12/1989 | Johnson et al. | 395/600 |
| 4,888,691 | 12/1989 | George et al. | 395/700 |
| 5,023,906 | 6/1991 | Novas | 379/372 |
| 5,049,873 | 9/1991 | Robins et al. | 340/825.06 |
| 5,124,909 | 6/1992 | Blakely et al. | 395/200 |
| 5,179,702 | 1/1993 | Spix et al. | 395/650 |
| 5,210,687 | 5/1993 | Wolfberd et al. | 364/408 |

OTHER PUBLICATIONS

IBM "Introduction to Distributed Relational Data", Reference GG24–3200–00, Sep. 1988 (Brungnole et al.).

*Primary Examiner*—Kevin A. Kriess
*Assistant Examiner*—John Q. Chavis
*Attorney, Agent, or Firm*—Sterne, Kessler, Goldstein & Fox P.L.L.C.; Prentiss W. Johnson, Esq.

[57] ABSTRACT

A user inquiry facility and method are described for use in a computerized data processing system which provides for monitoring of conversations or information transmission between a user of the data processing system, during the execution of the user's program, and a communication partner (which could include a database or other facility) associated with the data processing system. Task progress tracing information is selected from the conversations and stored. The stored information is updated to keep it current with the progress of the task of the user's program. An instruction is provided by the facility or method which, when activated, by the user selects task progress tracing information from the stored information and after formatting it for readability is transmitted to the user-s display or terminal. The inquiry facility is independent of the successful operation of the user's program so that it can feedback information to the user about any failure in the program or in any communication paths used for the conversations.

24 Claims, 12 Drawing Sheets

CONTROL FLOW OF DBMS
APPLICATION REQUESTOR

PERFORM INITIALIZATION PROCESS

PERFORM HANDSHAKING
PROCESS

PERFORM DBMS
STATEMENT PROCESS

DBMS/INQ INVOCATION

USER INQUIRY FACILITY FOR TASK STATUS IN A DISTRIBUTED SYSTEM

The application is a continuation of application Ser. No. 07/708,134, filed May 30, 1991 now abandoned.

FIELD OF THE INVENTION

This invention relates to a new facility for providing a user of a data processing system with task progress tracing information relating to the status of a program being executed by the user and/or about a communication link being used in the execution of the program or the receipt or transmission of data.

BACKGROUND OF THE INVENTION

Distributed data processing systems that access one or more application servers such as database servers, file servers and remote resources, from an application requestor typically use application programs selected by a user to access the resources or servers. These application programs are typically executed through an application requestor, that is available to the user, against one or more application servers which may be local or remote and are selected by the application program. During the execution of an application program, the user does not know what stage his application program has reached and typically does not know which application server the application is being currently executed against. For instance, the user typically would not know whether his application is accessing a local data processing system through a local application server, or a remote data processing system through a remote application server. This typically occurs when the user at one site is attempting to communicate with another site, for instance for the purpose of obtaining access to a database. After obtaining access to the database, it may be the case that the application server at the database data processing system site is in turn accessing further remote databases. All of this is transparent to the user, however it may be necessary for the user to determine the stage his application program has reached and the connections that have been established between his application and any other systems.

The terms "Requestor" and "Server" are well known in the data processing field. They are defined in the IBM publication "Introduction to Distributed Relational Data" GG24-3200 as follows:

Requestor: A program that sends a request to another site through a Server Requestor Programming Interface in response to a user application request.

Server: A program that responds to a request from another site through a Server Requestor Programming Interface.

Many times a user may wish to know the status of execution of his application program or the status of the application server. The invention disclosed herein allows the user to be informed and be brought up to date on the execution of his application so that appropriate action can be taken if necessary. This is particularly appropriate for applications that execute for extended periods of time. In these circumstances, the user may have no information as to whether his application is executing or being run successfully or is successfully accessing the appropriate application servers or whether an error has occurred and the application is malfunctioning, suspended, or not effectively applied.

In single or multi user data processing systems, and particularly, distributed processing systems, a number of problems may arise including such things as communication errors, database errors, or the unavailability of resources such as databases or communication links. If a problem arises, the user may be required to contact a data-processing system operator or the application server operator and identify the problem so that it can be solved. For instance, the user may need to know the identification of the application server that he is currently connected to in order to contact the correct application server operator so a server problem may be diagnosed and action taken.

If certain status information could be supplied to the user, while his user application program is being executed, he might be able to diagnose and fix any problem himself or determine that the application is running correctly and that there is no problem. Information that may be useful to the user would include the length of time he has been waiting, information about communication links, identification of the statement being executed in the application, or the identification data associated with a request of the application program being employed.

In the past, as the user typically did not have this information, he would have limited choices.

The user could terminate the application being run and repeat the process using trace facilities if available to determine which application server request is being processed if the user's application program went into a waiting state.

Other alternatives include trace statements added to the application itself, creating undue programming overhead. From the tracing procedure adopted the user could possibly identify the correct server operator and attempt a solution. This is at times difficult or may not be possible, for instance in the case of commercial software, where source code is not available thus not allowing the introduction of tracing elements. It also requires a fair amount of technical knowledge by the user. This type of solution is unwieldy and often takes a great amount of time to regenerate the problem. Often the problem cannot be recreated, so that the user does not get much useful information.

As another choice, the user could attempt to contact each of the application server operators in turn requesting that they investigate the problem at their end. In order to do this, the user has to know which application server machine he is connected to or was connected to. Many times this information is not known to the user because the typical user does not usually need to know this information or it has been concealed for any variety of reasons. Most likely, only the more sophisticated users would be interested in the information or be able to apply it usefully.

To demonstrate the problem with known prior art systems, an example using a distributed database system is given in FIG. 1. In this example, a database application program entitled "User Application" is designed to access three databases, DM1, DM2 and DM3. The user may know that these three databases are going to be accessed by the application program or he may not. Even if he does know, he may not know when they are going to be accessed. At certain times during the execution of the user application program, certain statements are directed to each of the three different databases. For this example the databases are managed by a Database Management System (shortened to DBMS). The IBM Structured Query Language/Data System is one example of a database management system. For instance, after initializing the program, a DBMS CONNECT statement is executed to access database server DS1 to connect to database DM1. Subsequent statements, such as EXECUTE DBMS statement 1, may retrieve some data from database DM1 by means of database server DS1.

Subsequently, after a number of other program steps are executed by the user application, the application may seek to connect to database DM2 by means of executing the statement DBMS CONNECT TO DM2. If, during the course of the execution of the application program, DBMS statement 2 requires a lock that another users' application is holding, the user application waits until the lock is freed. If the other user happens to have interrupted his processing without freeing up the locks he is holding, the user could wait indefinitely.

The first response of a slightly more sophisticated user would be to call up a database operator and ask which user application is holding the locks that are required to continue processing. The problem is that the user might not know which of the three database operators he should contact—the operator for DM1, DM2 or DM3.

The invention disclosed herein addresses a solution to this problem.

This invention can be applied in accessing single or multi system environments and can be applied by the user in problem determination and diagnosis at the users' terminal.

SUMMARY OF THE INVENTION

This invention provides a data processing system facility and a method for use in a data processing system that offers a user inquiry facility for monitoring a conversation between a user of the data processing system, after or during the execution of the user's program performing its task, and a communication partner associated with the data processing system. The communication partner, may be a database, a printer, another user, or another facility of the data processing system. The partner may, in the case of other embodiments of the invention, be located in another data processing system that is to be linked to the user's system for the task performance. A selection device or program module is provided for selecting task progress tracing information from the conversation. This information is stored and updated to maintain its currency with the task performance. An inquiry instruction is provided which is activated by the user to select the task progress tracing information that was stored, and this selected information, which may represent the state of the user's program, the state of communications with the user, identification of the communication partner, and the like is prepared for sending to the user, either directly to the user's display terminal, which could include a display screen, or printer, or in some embodiments, a storage file that the user could set up in advance and review when convenient.

The method and facility are applicable to single or multiuser data processing systems, standalone or distributed processing systems, and are useful while executing application programs or accessing databases.

A typical single user or multiuser, data processing system which includes an embodiment of the invention would include a monitor device or program module for monitoring or procuring the monitoring of conversations (communications) between a user of the data processing system, after the execution of the user's program has begun performing a task, and a communication partner or facility which is associated with the user's or a connectable data processing system. A selection device or program module would be responsible for selecting task progress tracing information from the conversation of the user. This selected information would be stored in a storage block, preferably controlled by the user's data processing system operating system. The information stored is updated to keep it current with the operation of the user's program and communications. A special instruction is provided which is not affected by the user's program after it has been initiated for accessing the task progress tracing information that has been stored and updated. A preferable approach to implementing this instruction is to use a priority operating system command developed for the data processing operating system. This is the inquiry instruction which is activated by the user and to which the data processing system responds, for instance, by suspending the operation of the user's program, if necessary, and selecting the updated task tracing information that was stored. This information is then preferably formatted to improve its user Intelligibility and sent to the user's terminal for display.

A number of embodiments of the invention are possible:

Updating of the task progress tracing storage information can be done by replacing older Information with current information.

The inquiry instruction can be implemented by a priority instruction, for instance, of the immediate priority type.

The user's application could be run with the aid of an application requestor which interfaces between the user program and the communication partner.

Preferably the storage, inquiry and transmission of information by the inquiry facility should be independent of the user program so that the inquiry facility will not be dependent on the user program after it has started.

As applied to a VM system where one user can only run one application at a time it will be necessary to interrupt the operation of the user program in one embodiment of the invention.

In parallel processing systems, a separate path may be established to make the necessary inquiry and transmission of information to the user.

DESCRIPTION OF THE PREFERRED EMBODIMENT

Figure 1:
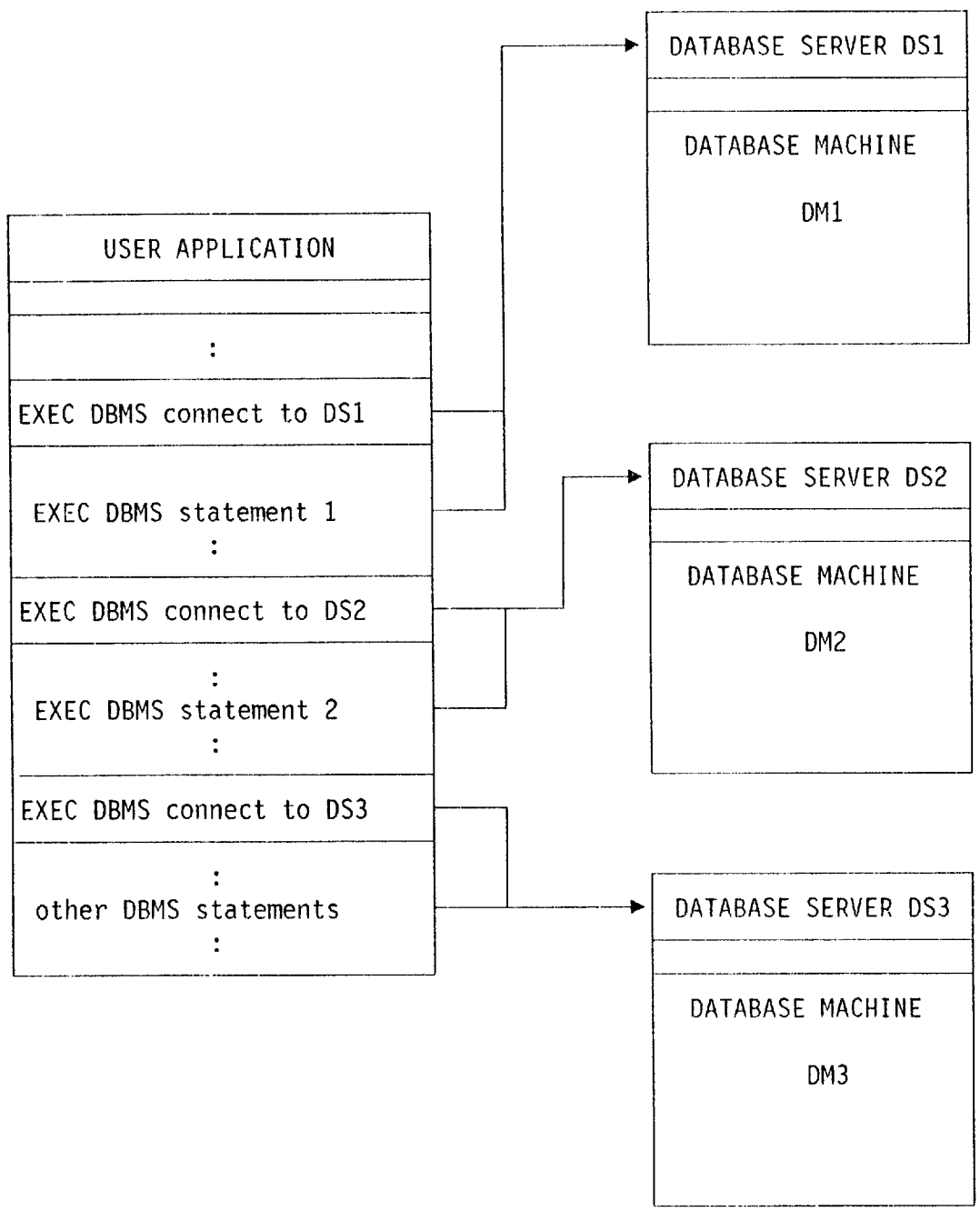
FIG. 1 is a diagrammatic illustration of the relationship between a sample user application accessing a number of databases.
Figure 2:
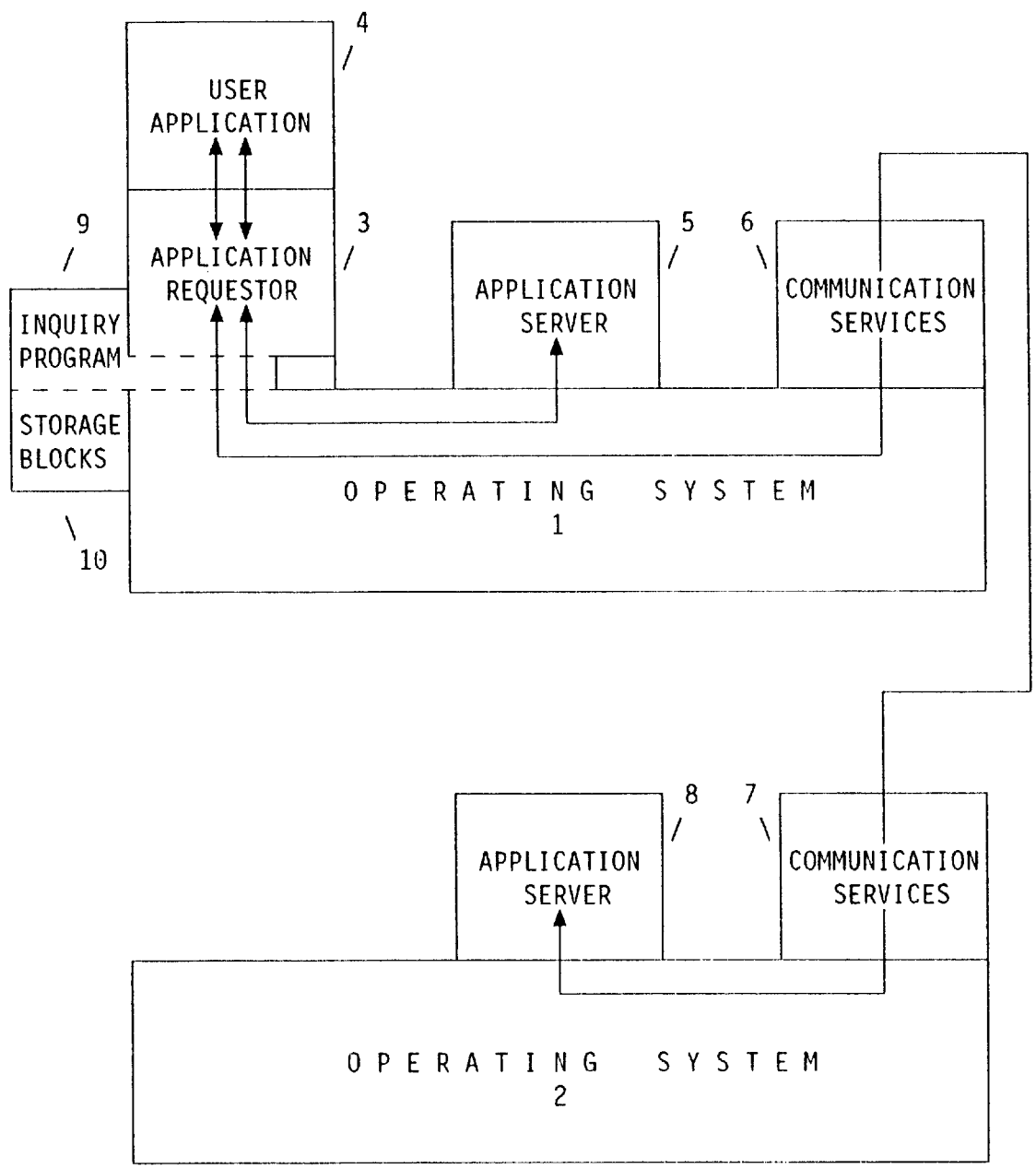
FIG. 2 is a diagrammatic illustration of an embodiment of the invention in a multi system environment.

Referring first to FIG. 2, which illustrates an embodiment of the invention in a multi system environment, in which there are two operating systems, 1 and 2 respectively. This system environment consists of an application requestor program 3, running on operating system 1, which interfaces between the user application 4 (being run by a typical data processing system user) and an application server 5 also running on the operating system 1, which serves the purpose of managing and retrieving data stored in the data processing system. If a user employing user application 4 desires to access information or use the facilities of a remote data processing system, for instance operating under operating system 2 as illustrated, the application program 4 of the user, employing the application requestor 3 would access the operating system 2 through communication services 6 at the local site and communication services 7 at the remote site where operating system 2 is located in order to access through operating system 2 application server 8 to access or process data from that site.

During the running of the user application program 4, inquiry facility 9 (which may be part of application requestor 3 or operating system 1) monitors information passing between the application requestor 3 and the operating system 1, including information about the application server 5 and communication services 6 between the local 1 and remote operating systems 2 and the remote application server 8.

During the execution of the user application, task progress tracing information obtained from monitoring information passed back and forth between the user and the server is being recorded in one or more storage blocks. The recorded information, preferably includes the type of database being accessed, communication line status, communication location identification, the stage of the user application being executed, etc. At any point after initiation of the user application the user may, by employing a facility offered by this invention, address the storage blocks to determine the current status of any communication links, databases being used, or the status of the application program itself, to determine whether the application program is running, the identification of the services being accessed and the status of the communication lines.

Figure 3:
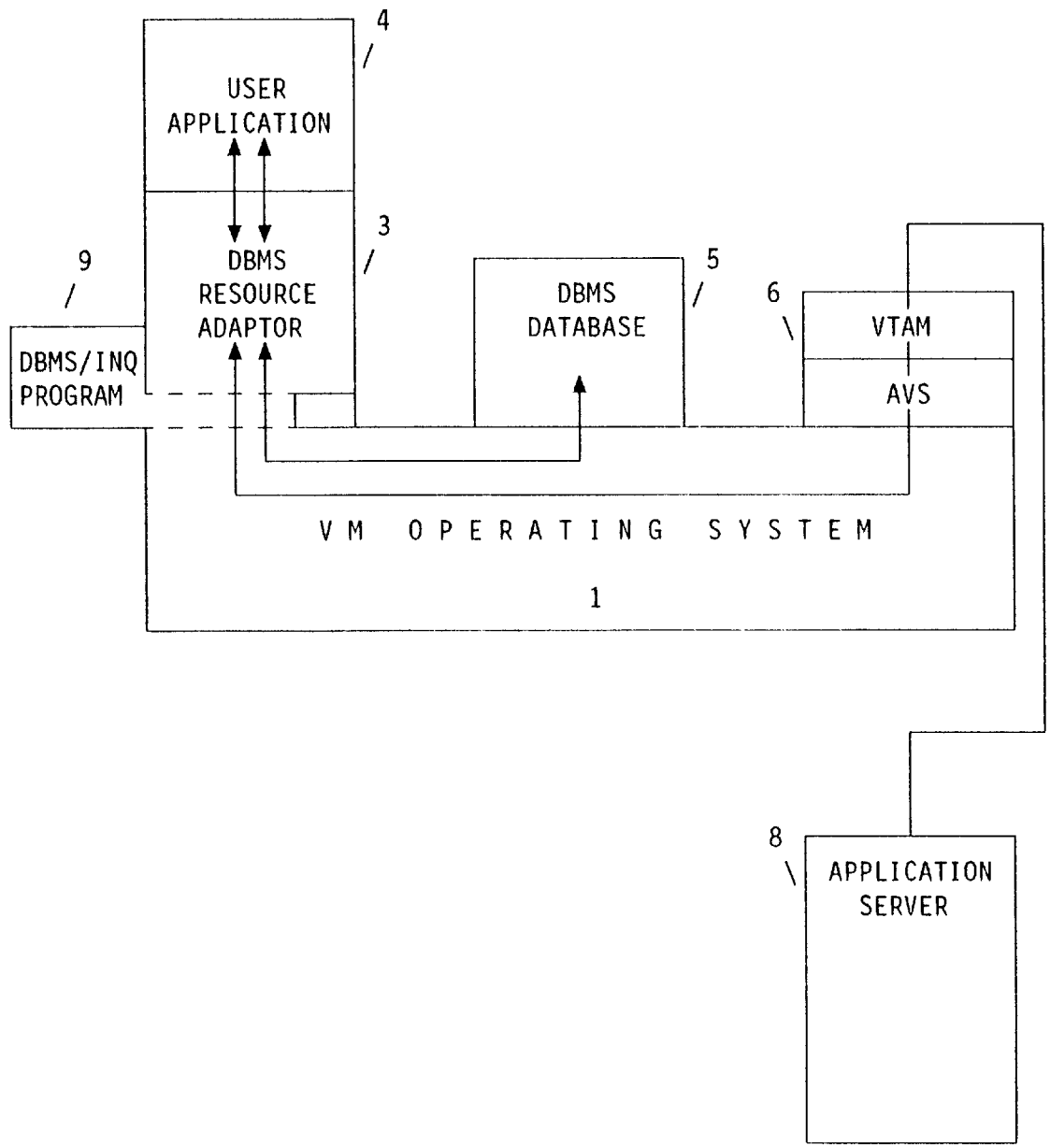
FIG. 3 is a diagrammatic illustration of the relationship between a specific embodiment of the invention and a specific data processing system.

FIG. 3 illustrates the specific embodiment of the invention operating under a VM operating system 1. In this embodiment the application requestor, which embodies DBMS resource adapter 3, is used to assist user application 4 to access information stored in DBMS database 5 or in a remote application server 8 through the auspices of communication services 6 in this illustration provided by operating system communications programs. As in FIG. 2, inquiry monitoring program DBMS/INQ 9 monitors the information passed between the DBMS resource adapter 3 and other devices managed by the operating system 1 or devices in communication with it, such as remote application server 8.

In the system shown in FIGS. 2 and 3, the inquiry program is associated with the individual application requestor used by each user application.

Figure 4:
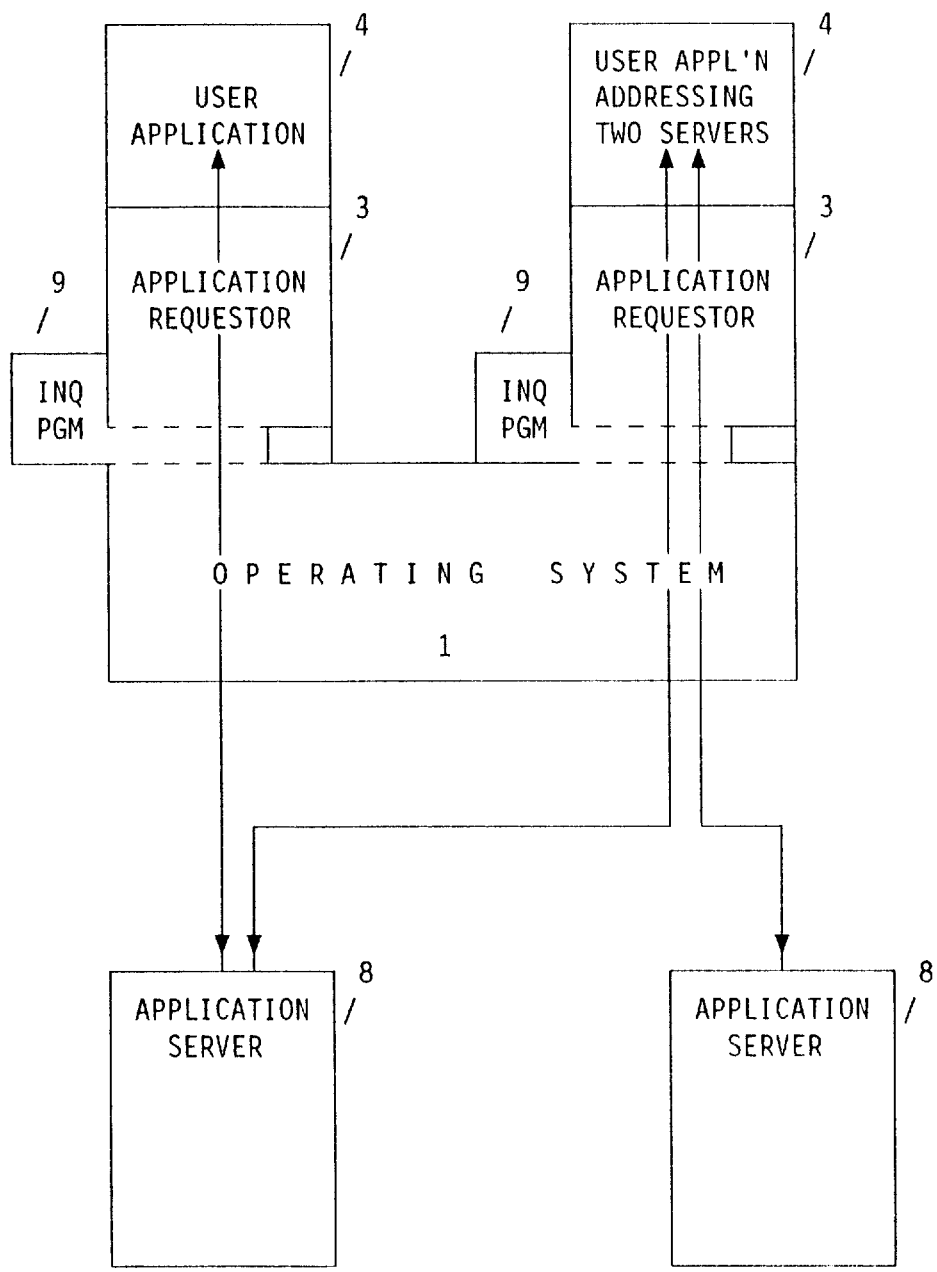
FIG. 4 is a diagrammatic illustration of an embodiment of the invention in which an inquiry facility is associated with each user application.
Figure 5:
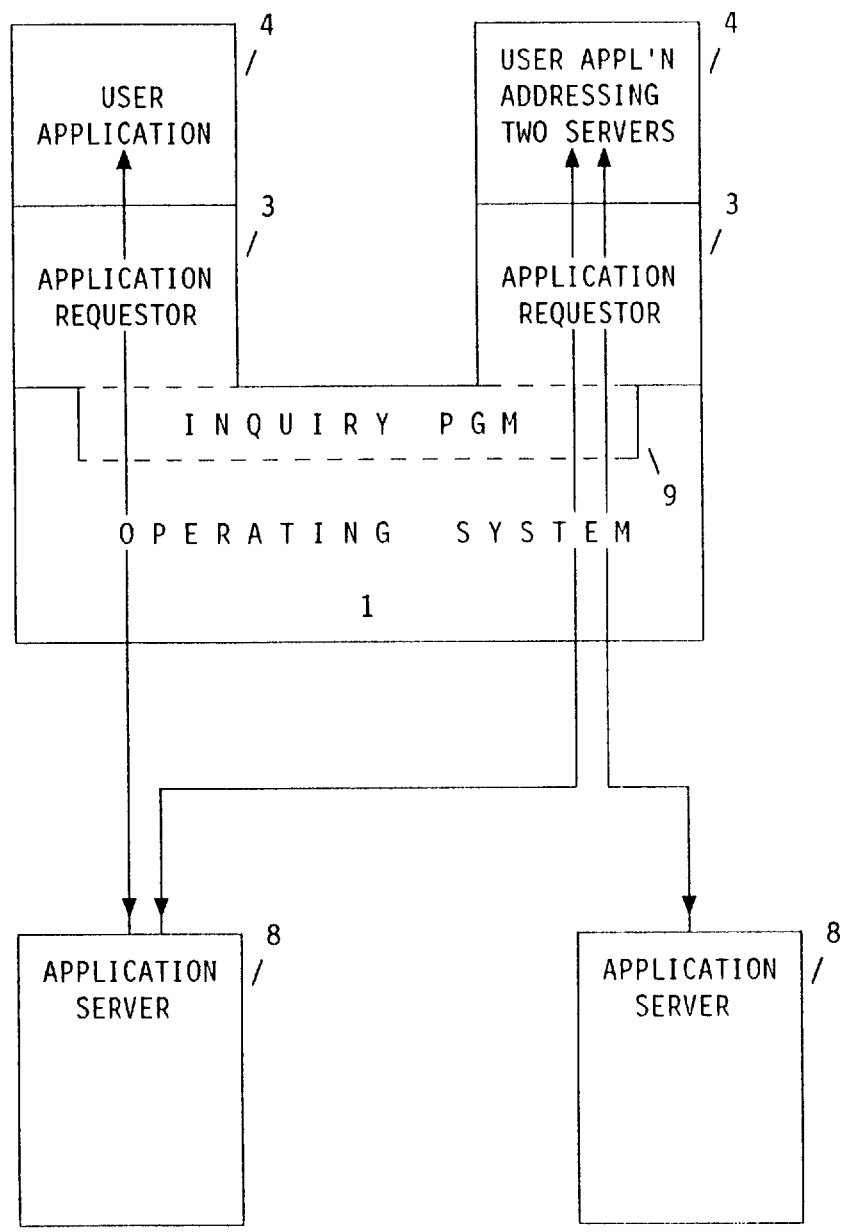
FIG. 5 is a diagrammatic illustration of an embodiment of the invention is which the inquiry facility serves multiple application requestors and one or more application servers, the inquiry facility being independent of either.
Figure 6:
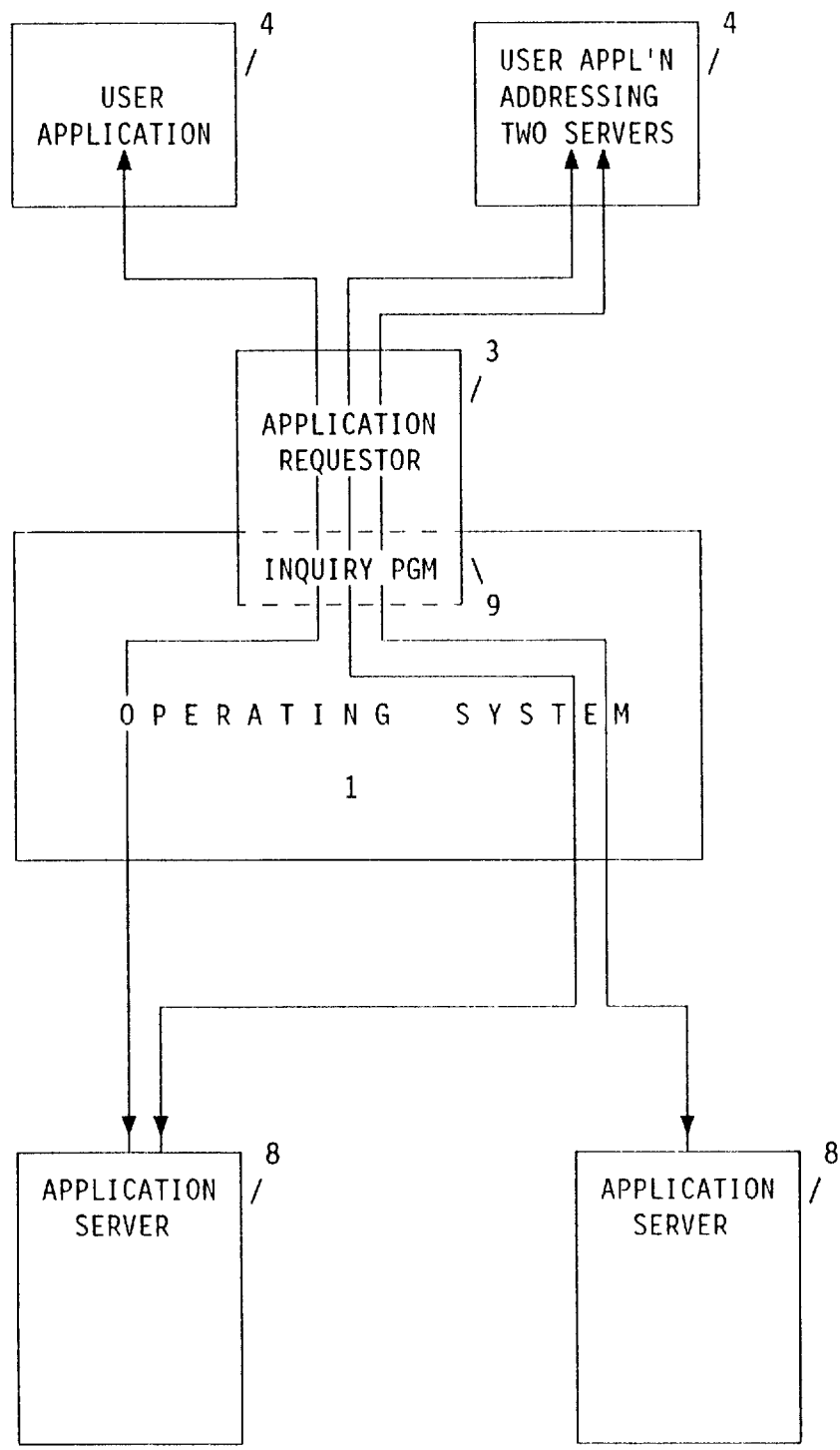
FIG. 6 is a diagrammatic illustration of another embodiment of the invention in which the query facility is associated with a single application requestor which may handle one or more user applications.

FIGS. 4, 5 and 6 illustrate alternative versions of multi user data processing systems. FIG. 4 illustrates a system in which an inquiry managing program facility is associated with each application requestor. FIG. 5 illustrates another embodiment of the invention where the facility is associated with the underlying operating system of the data processing system or is part of the operating system and keeps track of the information passing between each application requestor and the application servers accessed by them.

FIG. 6 illustrates another multi user data processing system in which the inquiry facility may be associated either with a common application requestor serving a number of user applications or with the underlying operating system.

Figure 7:
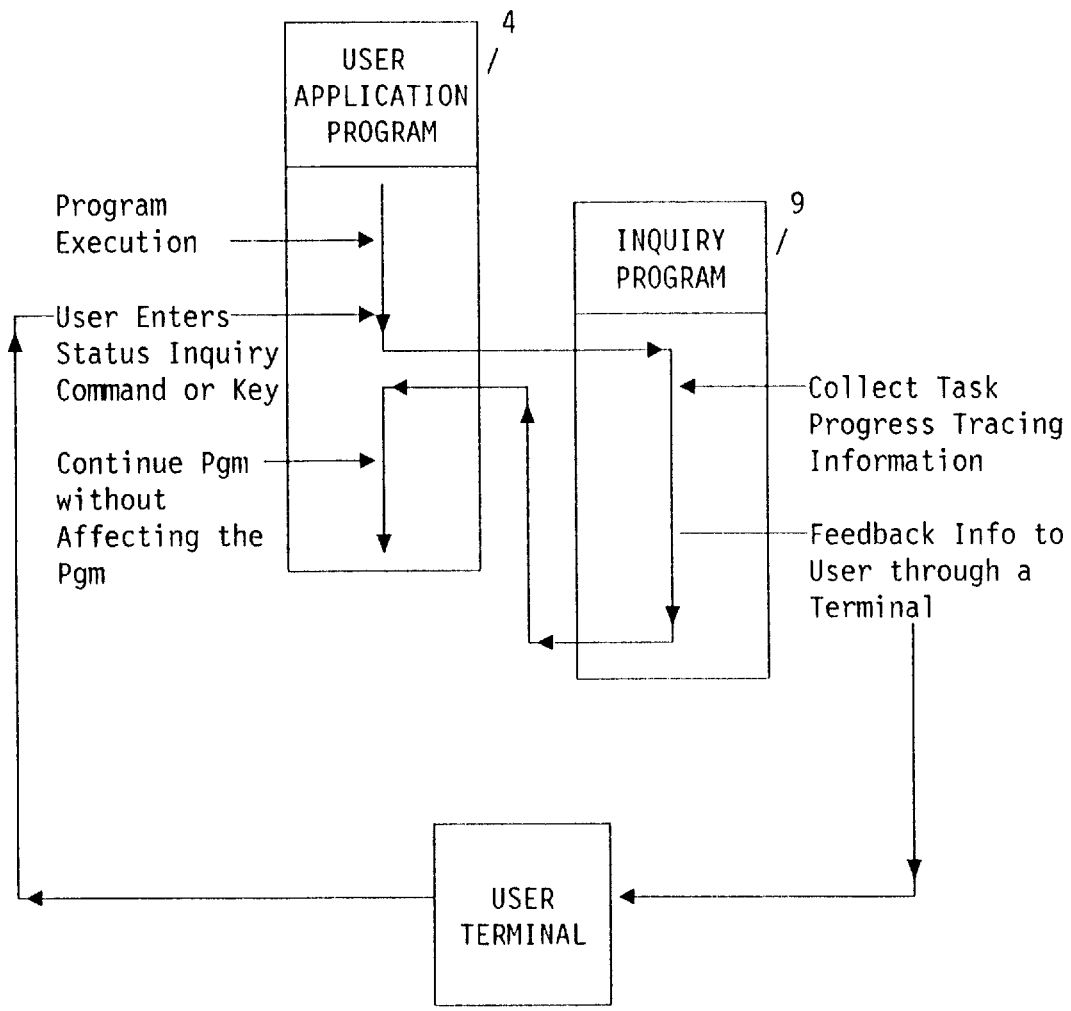
FIG. 7 is a diagrammatic illustration of an embodiment of the invention applied to the execution of a user application program.

FIG. 7 illustrates an application of the instant invention, the inquiry facility to the execution of the typical user application program. In general, when a user application program is being executed the user may desire to determine the status of this program, i.e., whether it is being executed or whether there is any problem in the execution of this program, the operating system, or in any of the information facilities being accessed. To do this, the user enters a status inquiry command (provided by the invention) from his terminal; the execution of the user's application program is suspended temporarily, as is the application requestor operator, as the inquiry facility requests and receives current information from an information storage bank. This information may include the status of the application program, connections being made, database information. The inquiry facility then conveys the information directly to the user through the user's terminal, or it may store the information in a separate file to be accessed by the user at his discretion. After feeding back the information to the user, control is once again passed to the user application which continues where it has left off without otherwise affecting its execution (whether or not it has been successfully running).

In an alternative embodiment of the invention in a data processing system, application requestor 3, such as shown in FIG. 3, can set up a status inquiry command or key during the execution of the first DBMS application program statement or on initial setup before execution of the statement. Any time the command or key is activated during the execution of the application program, control is diverted to a part of the operating system which gives control to the inquiry program facility DBMS/INQ. The DBMS/INQ program then collects information about the current status of the executing application program. This includes information relating to whether the program is running, current databases connected, the connections, amount of time spent on the request, etc. This information is obtained by scanning through storage blocks that are constantly updated to reflect the application's status. In addition to looking at its own control blocks, the requestor can query the operating system for status Information. In another alternative embodiment of the invention the inquiry facility could also establish another connection to the server to request the status of the program progress at the server or database machine site. After all the appropriate information is collected it is presented to the end user at the end user's terminal display or, alternatively, as output into a prespecified file. This is all done without terminating the user's application program.

The invention allows the user to diagnose and solve problems without getting database operator involved unless absolutely necessary. With information provided by the inquiry command a knowledgeable user should be able to diagnose a problem, and find a solution without other external help.

Information provided by the inquiry facility can allow the user to find a database machine that is being connected to and permit contact with the appropriate operator without trial and error. By allowing the user to inquire of the status of the system without terminating the application program and running a trace facility as has been required in the past, this invention assists in more quickly diagnosing problems in a distributed environment.

In many data processing systems the operating system has a hierarchy of commands; so that a user or operator can interrupt an application and go to another task or another program.

One embodiment of this invention may use a system priority immediate command that could be implemented in the IBM VM/CMS operating system to provide the inquiry facility. The immediate command allows the end user to issue the command any time there is a problem.

The "IBM VMISP Application Development Guide for CMS" (Release 6), SC24-5286-01, provides information on how to program immediate commands.

The DBMS/INQ command that may be used in this embodiment of the invention described is set up as a priority immediate command. It can be used by DBMS in the VM/CMS operating system as a CMS immediate command. DBMS/INQ is set up on the user's machine on the first database statement execution. For this and subsequent database statements executed, storage or control blocks are updated to reflect the current status of the connection and all diagnosis information that is pertinent to the user. If at any time a problem occurs, the user can issue the DBMS/INQ immediate command and a set of routines are activated immediately upon the user's VM session or machine. The routines are called immediately since the operating system recognizes that the DBMS/INQ command has priority over the execution of any other statements or commands. These modules use the information in the control blocks that were previously set up to display information, on the terminal screen of the user using DBMS/INQ messages. The user can use this information to diagnose the problem or contact the appropriate database operator.

IBM publication entitled "CMS Command Reference", (SC19-6209) provides information on CMS immediate commands. IBM publication "SQL/DS System Planning and Administration for VM/System Product" (SH09-8018) provides information about connecting to multiple databases in SQL/DS applications.

IBM publication entitled "Virtual Machine/System Product Introduction", (GC19-6200-05) describes the concepts and terms relating to virtual machines. These concepts and terms are familiar to system users and programmers.

Referring to FIGS. 8 through 11, there is illustrated the execution of a user application program on a data processing system that incorporates one embodiment of the invention.

Figure 8:
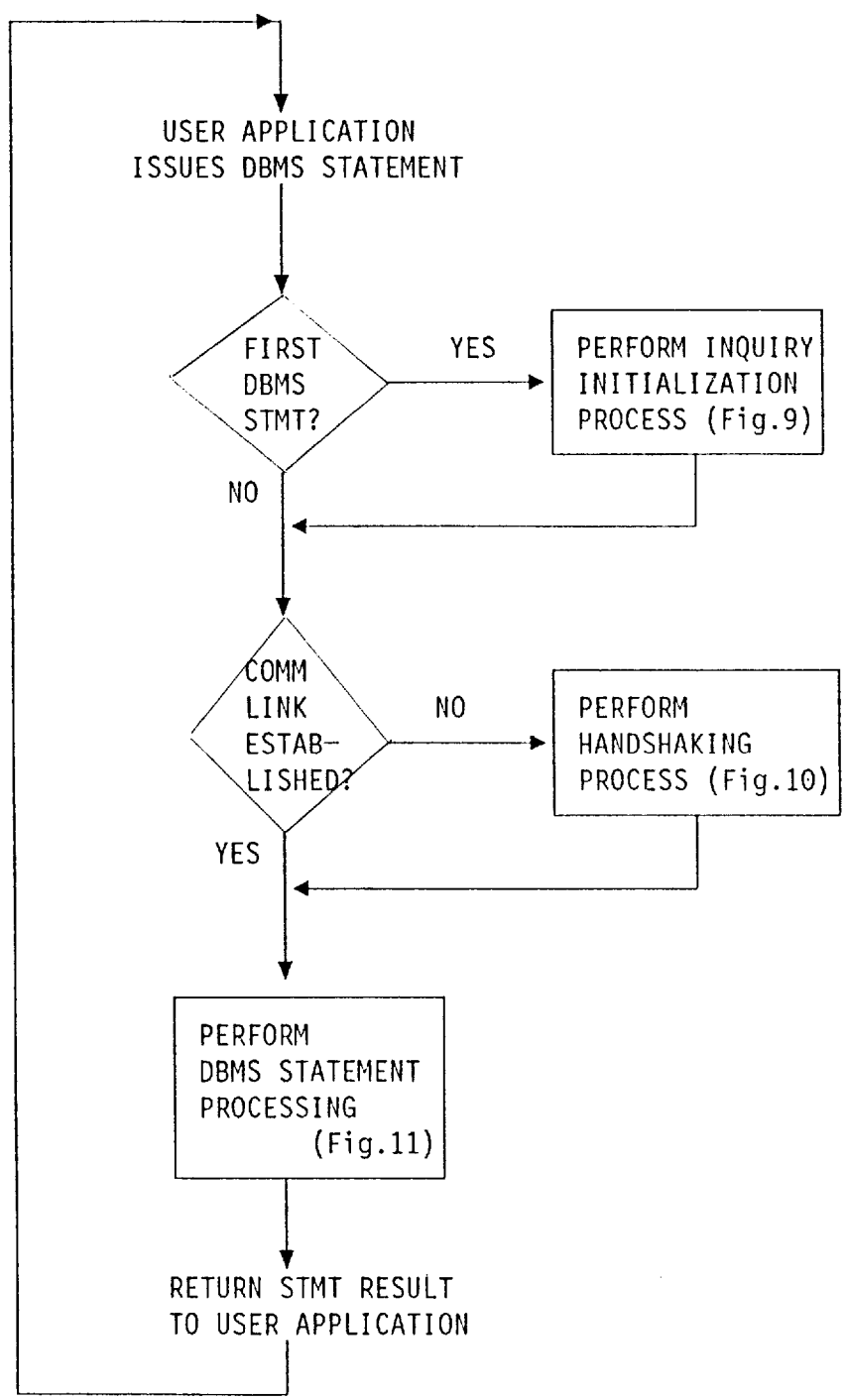
FIGS. 8, 9, 10 and 11 are flow diagrams of a requestor employing an embodiment of the invention.

Referring to FIG. 8, in the execution of a user application on the application requestor the application program issues a first statement, in this case a DBMS statement, the application requestor determines whether or not this is the first DBMS statement. If it is not program execution continues. If it is, the first DBMS statement then initialization of the DBMS/INQ facility is performed. Details of this initialization process are depicted in FIG. 9.

Figure 9:
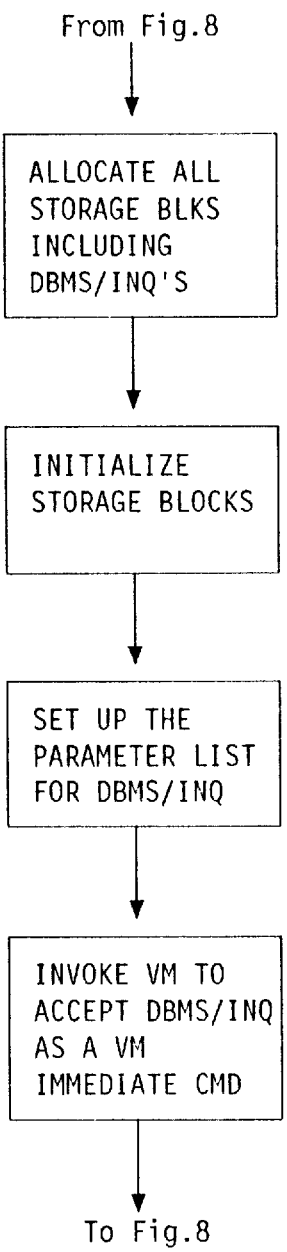

In the initialization process as shown in FIG. 9, the operating system is asked to allocate storage for the DBMS inquiry control block. A storage area is set up as a control block for the use of the DBMS/INQ facility. One control block is established for storing information about each communication link. The control blocks are initialized typically by blanking out the area so that no conflicting information is present. Next a parameter list is set up in the application requestor for setting up the immediate command for recognition by the VM operating system. This parameter list includes an address for DBMS/INQ; the command that the operating system needs to recognize for DBMS/INQ so the user can invoke it. Next VM/CMS is instructed to accept DBMS/INQ as a VM/CMS immediate command using the previous parameter list. After performance of the initialization process regular execution of the user application resumes (referring again to FIG. 8).

Figure 10:
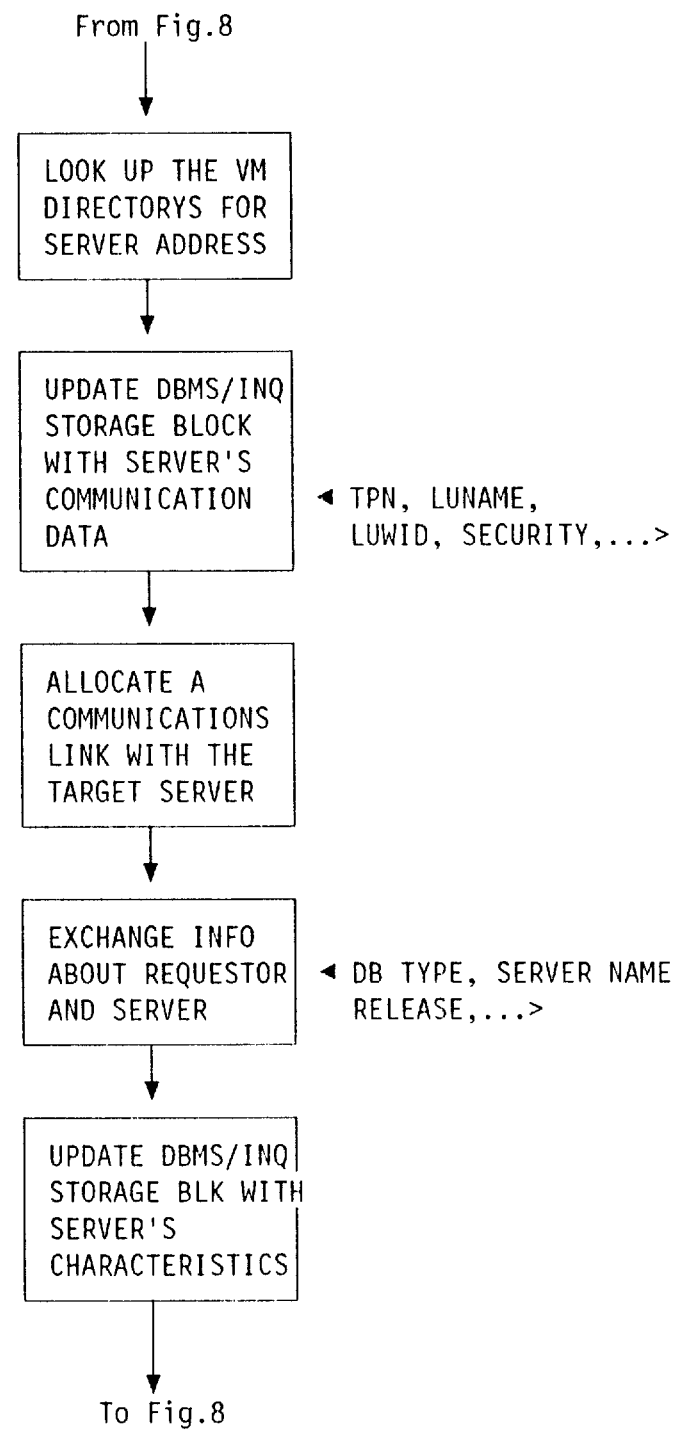

Typically the next step in the execution of the application program is to establish a communication link with the application server. If the communication link has been previously established then it can be used to perform DBMS statement processing. However, if the communication link has not been established then a handshaking process, as depicted in FIG. 10, is performed to identify the database type and location and establish the communications link.

Information is obtained from the operating system VM/CMS, in this case to determine the database address, whether local or remote. That information is used to update a control block. The information includes the application server communication data. A communication link is set up between the application requestor and the application server. Then information is exchanged between the requestor and server identifying the database type, the server name and the release level for instance. This information is used in updating the DBMS/INQ control block associated with this communication link so that it has current information on the server's characteristics. After this handshaking process has been concluded, resumption of the user application continues (see FIG. 8).

Figure 11:
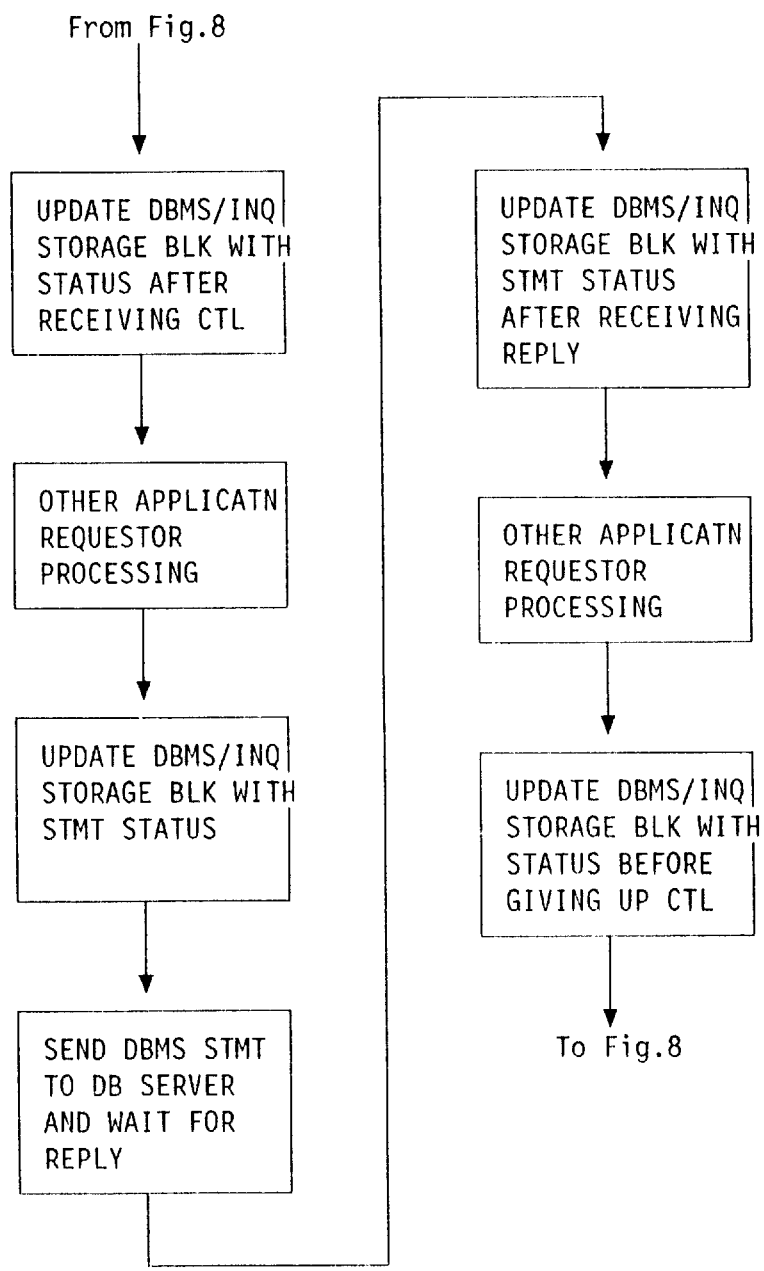

FIG. 11 illustrates the execution of a typical application program. As each statement in the program is executed, the status of the program (conveying its progress) is fed to the DBMS/INQ query control block to update it with the current status information. The DBMS/INQ control block may be updated (to reflect the current status of the application program) for instance by indicating identification of the current DBMS statement being executed. The DBMS statement is sent by the application requestor to the database server; after which the application requestor awaits the reply from the application server.

At this point the application and application requestor are in a communication wait state. This information is reflected in the DBMS/INQ control block, and of course, is available for presentation to the user through the DBMS/INQ facility. If a problem occurs and information is not forthcoming from the database server the user could determine this by invoking the DBMS/INQ command.

When a reply is received from the database server the DBMS/INQ control block is updated with the reply received to reflect the current status. That is, it is no longer in a communication wait state, the reply has been received and will be processed by the application requestor. When the application requestor begins processing the reply this fact will be reflected in the DBMS/INQ control block.

After the application requestor has done the processing the DBMS/INQ control block is updated with the result of the processing to reflect the new current status before control is given back to the user application so that it can execute the next user or DBMS statement (see FIG. 8).

Figure 12:
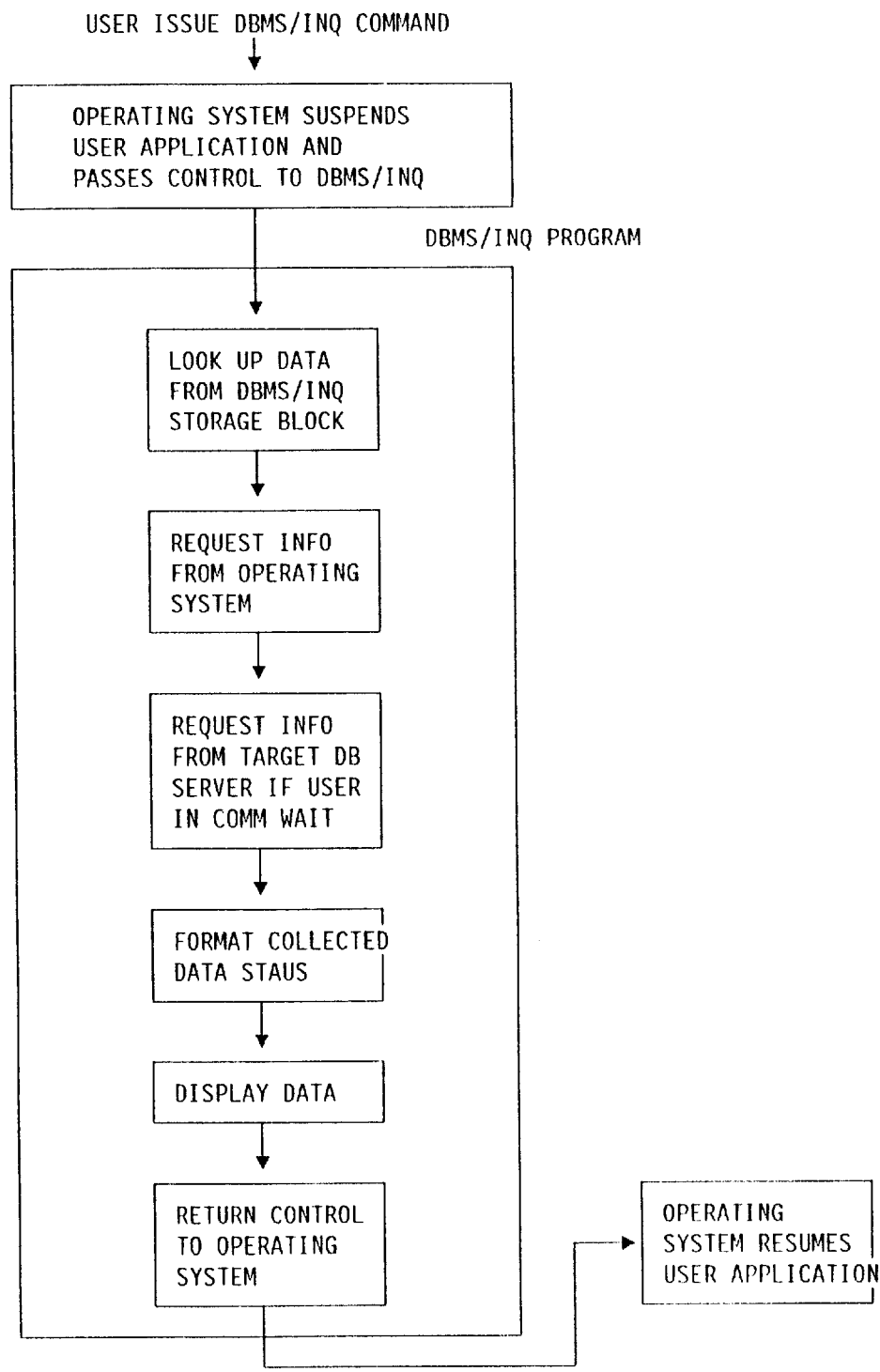
FIG. 12 is a flow diagram depicting the invocation and execution of an embodiment of the inquiry priority instruction of the invention.

FIG. 12 is a flow chart illustrating the invocation of an embodiment of a DBMS/INQ query instruction. The user can initiate the execution of the DBMS/INQ program at any time during the execution of the user application.

When the user issues a DBMS/INQ command the operating system recognizes DBMS/INQ as a priority command and that associated with such command is a priority program which must be run immediately. Then it suspends execution of the user application and passes control to the DBMS/INQ facility. When control is passed to the DBMS/INQ facility program It first addresses the DBMS/INQ control block to determine the current data, then it may request information from the operating system concerning the amount of time the program has taken for execution, current date and time, number of cycles of processing use, etc. Information can be requested from a target database server if the user is waiting for communications information. Once the data has been collected it is preferably converted and formatted to user friendly displayable form which may be displayed directly at the user's terminal or stored in a preselected file for reference by the user. Subsequently the DBMS/INQ facility returns control to the operating system which then resumes the user application execution if it is being executed.

Table 1 describes in pseudo code a program depicting one embodiment of the inquiry facility of this invention.

5. The Logical Unit of Work Identifier (LUWID) is an identifier which allows a database to uniquely identify a logical unit of work (more commonly known as a transaction) on a database. The LUWID is saved in the DBMS/INQ control block by the Application Requestor when a transaction is started.

Here it is retrieved from the DBMS/INQ control block and converted into a printable and easily understandable format.

6. The formatted LUWID is appended to an output string until the rest of the information has been gathered.

TABLE 1

```
1  OBTAIN DATE TIME                call operating system to obtain current
                                   date and time
2  FORMAT DATE TIME
3  PRINT HEADER                    print header with current date
                                   and time
4  FOR EACH CONVERSATION           loop through all conversations
      [SET LUWID IN OUTPUT]
5  FORMAT SAVED LUWID
6  OUTPUT        OUTPUT + SAVED LUWID
      [SET EXTERNAL NAME (LOGON ID.CMS WORKUNIT ID) IN OUTPUT]
7  FORMAT SAVED EXTERNAL NAME
8  OUTPUT = OUTPUT + SAVED EXTERNAL NAME
      [SET DATABASE NAME IN OUTPUT]
9  FORMAT     SAVED DATABASE NAME
10 OUTPUT     = OUTPUT + SAVED DATABASE NAME
      [SET SERVER CLASS IN OUTPUT]
11 FORMAT SAVED SERVER CLASS
12 OUTPUT = OUTPUT + SAVED SERVER CLASS
      [SET SERVER VERSION IN OUTPUT]
13 FORMAT SAVED SERVER VERSION
14 OUTPUT = OUTPUT + SAVED SERVER VERSION
      [SET USER PROGRAM STATUS IN OUTPUT]
15 SELECT (STATE)
16 WHEN (USERPROC)
17   OUTPUT = OUTPUT + 'APPLICATION PROCESSING'
18 WHEN (COMWAIT)
19   OUTPUT = OUTPUT + 'COMMUNICATIONS WAIT'
      [AGENT WAITING SINCE]
20   FORMAT SAVED COMMUNICATIONS WAIT TIME
21   OUTPUT = OUTPUT + SAVED COMMUNICATIONS WAIT TIME
22 WHEN (ARPROC)
23   OUTPUT = OUTPUT + 'APPLICATION REQUESTOR PROCESSING'
24 END SELECT
      [SET LUNAME IN OUTPUT]
25 FORMAT SAVED LUNAME
26 OUTPUT = OUTPUT + SAVED LUNAME
      [SET TPN IN OUTPUT]
27 FORMAT SAVED TPN
28 OUTPUT = OUTPUT + SAVED TPN
29 PRINT OUTPUT                    print output we just built
30 END FOR
31 RETURN                          return to set up routine
```

Referring to the statement numbers (1 to 31) in Table 1, a detailed explanation follows:

1. When the DBMS/INQ program, or any immediate command program for that matter, is running it has the ability to retrieve information from the operating system by calling or invoking operating system routines. In this embodiment of the invention statement 1 is an operating system routine to obtain the current date and time.

2. The date and time retrieved from the operating system is not in a format understandable to the average user so it is formatted and converted into one which is.

3. A heading is printed so the user knows the information being reported is accurate as of the date and time.

4. This statement signifies that the program will go into a loop and for each conversation, it will perform steps 5 through 29.

7. The External Name identifies the user. The database knows the user as this identifier. The External Name is created by the Application Requestor on behalf of the user. It is a necessary piece of information in the handshaking process when a conversation is started. It is saved in the DBMS/INQ control block. Again, this information may be stored in a rather cryptic manner therefore it is converted and formatted.

8. The formatted External Name is appended to the output string.

9. The Database Name identifies the database or target. At the start of a conversation, handshaking takes place. During handshaking information is exchanged between the Application Requestor and the target. One piece of information given to the Application Requestor by the target is its Database name. The Application Requestor then saves it in the DBMS/INQ control block. Again, this information may be stored in a rather cryptic manner therefore it must be converted and formatted.

10. The formatted Database Name is appended to the output string.

11. The Server Class tells the Application Requestor and the user application what type of database it is. This is another piece of information given to the Application Requestor by the target database during handshaking. The Application Requestor then saves it in the DBMS/INQ control block. Again, this information may be stored in a rather cryptic manner therefore it is converted and formatted.

12. The formatted Server Class is appended to the output string.

13. The Server Version tells the Application Requestor and the user application what version or release level the database is. This is another piece of information given to the Application Requestor by the target during handshaking. The Application Requestor then saves it in the DBMS/INQ control block. Again, this information may be stored in a rather cryptic manner therefore it is be converted and formatted.

14. The formatted Server Version is appended to the output string.

15. For DBMS and DBMS/INQ specifically, the user program can be in one of three states. The state is represented numerically within the DBMS/INQ control block. It is updated by the Application Requestor whenever the Application Requestor senses a state change. However, the numerical representation of the states needs to be mapped to a form a user can understand and the SELECT statement is used for the selection process.

16. This is the case where CMS is running the user application program.

17. The string 'APPLICATION PROCESSING' is appended to the output string.

18. This is the case where the Application Requestor is in communications wait (i.e. it's waiting for a reply from its communication partner). Whenever this state is entered in the DBMS/INQ control block by the Application Requestor, an associated start wait time is also entered. When DBMS/INQ reports this state or condition it also reports the start date and time of the communications wait. It's useful for the determination of communication problems.

19. The string 'COMMUNICATIONS WAIT' is appended to the output string.

20. Again, the date and time in the DBMS/INQ control block should be converted to a format understandable to the average user.

21. Append the communications wait date and time to the output string.

22. This is the case where VM is running DBMS/INQ Application Requestor.

23. The string 'APPLICATION REQUESTOR' is appended to the output string.

24. End of select processing.

25. The Logical Unit Name (LUNAME) is an item of information used in establishing communications with a particular target. This information is retrieved by the Application Requestor from the VM communications directory and placed into the DBMS/INQ control block. Again, this information may be stored in a rather cryptic manner therefore it must be converted and formatted. LUNAME is used in determining the address of an Application Server. The term LUNAME is known to data processing system administrators.

26. The formatted LUNAME is appended to the output string.

27. The Transaction Program Name (TPN) is an item of information used in establishing communications with a particular target. This information is retrieved by the Application Requestor from the CMS communications directory and placed into the DBMS/INQ control block. Again, this information may be stored in a rather cryptic manner therefore it is converted and formatted. TPN is used in determining the address of an Application Server. The term TPN is well known to data processing system administrators.

28. The formatted TPN is appended to the output string.

29. Print the created output string for this conversation.

30. Repeat the process for all conversations.

31. Return control to VM.

What is claimed is:

1. A user inquiry facility for a computerized data processing system, comprising:
   monitoring means for monitoring a conversation between a user of said data processing system after initialization during the execution of a user program to perform a task, and a communication partner associated with said data processing system;
   selection means for selecting task progress status information from said conversation;
   storage means for storing said selected task progress status information;
   updating means for updating said task progress status information stored in said storage means by replacing noncurrent data with current data; and
   inquiry means responsive to an instruction activated by said user to select task progress status information from said storage means for transmission to display means accessible by said user.

2. A multiuser data processing system including a user inquiry facility comprising:
   monitoring means for monitoring a conversation between a user of said data processing system during the execution of a program for said user, and a communication partner associated with said data processing system;
   selection means for selecting task progress status information from said conversation;
   storage means for storing said selected task progress status information;
   updating means for updating said task progress status information stored in said storage means by replacing noncurrent data with current data;
   inquiry means responsive to an instruction activated by said user to select task progress status information from said storage means; and
   transmission means to transmit said task progress status information to a display terminal of said user.

3. A user inquiry facility for a computerized multiuser data processing system, comprising:
   monitoring means for monitoring information transmitted between a user of said data processing system, after initiation or during execution of a user program, and a communication partner to be accessed by means of said data processing system;
   selection means for selecting task progress status information from said transmitted information;
   storage means for storing said selected task progress status information;
   updating means for updating said task progress status information stored in said storage means by replacing noncurrent data with current data; and inquiry means responsive to an instruction from said user to select task progress status information from said storage means for transmission to display means accessible by said user.

4. A multiuser data processing system including an inquiry facility comprising:

monitoring means for monitoring information transmitted between a user of said data processing system, after commencement or during the execution of a user program, and a communication partner to be accessed by means of said data processing system;

selection means for selecting task progress status information from said information transmitted;

storage means for storing said selected task progress status information;

updating means for updating said task progress status information stored in said storage means by replacing noncurrent data with current data;

query means responsive to an instruction from said user to select task progress status information from said storage means; and transmission means to transmit said task progress status information to a display accessible by said user, wherein operation of said inquiry facility is independent of the successful execution of said user application program.

5. The multiuser data processing system of claim 2 wherein said inquiry means comprises means for interrupting the normal execution of said user program to display selected communication status information from said storage means.

6. The multiuser data processing system of claim 2 wherein said communication partner comprises a data processing or database facility of the user.

7. The multiuser data processing system of claim 2 further comprising an operating system for said data processing system with an application requestor facility program interfacing between said user program and said communication partner for the transmission of information therebetween wherein said transmission means is under the control of said operating system and independent of said user program.

8. The multiuser data processing system of claim 5 further comprising an operating system for said data processing system with an application requestor facility program interfacing between said user program and said communication partner for the transmission of information therebetween wherein said transmission means is under the control of said operating system and independent of said user program and said application requestor.

9. The multiuser data processing system of claim 8 wherein said application requestor is associated with a single user.

10. The multiuser data processing system of claim 8 wherein said application requestor is associated with a plurality of users.

11. The multiuser data processing system of claim 2 wherein said system further comprises:

an operating system for controlling the operation of said data processing system.

12. The multiuser data processing system of claim 11 wherein said inquiry means comprises means for activating a priority command as part of said operating system which results in the suspension of any user program operation, selection of task progress status information from said storage means, and transmission to said user's display.

13. The multiuser data processing system of claim 12 wherein said user's display includes any of the following:

a printer;

a viewing screen; or a storage file accessible by the user for display purposes.

14. The multiuser data processing system of claim 12 wherein said storage means comprises means for selecting storage locations controlled by said operating system within said application requestor.

15. The multiuser data processing system of claim 2 wherein said selection means comprises means for selecting the following task progress information from the information transmitted between said user and said communication partner:

identification of the user, identification of the communication partner, user program status, communication wait information, time of collection of the information from said storage.

16. The multiuser data processing system of claim 2 wherein said inquiry facility comprises means for implementing a separate instruction path from the user to said storage means, unaffected by the progress of the user program, to activate said inquiry means.

17. The multiuser data processing system of claim 2 wherein said inquiry facility comprises means for implementing a separate instruction path parallel to an information communication path used in the execution of the user program.

18. A method of providing an inquiry facility for a computerized data processing system, comprising:

monitoring a conversation between a user of said data processing system, when a user program has been initiated to perform a task, and a communication partner associated with said data processing system;

selecting task progress status information from said conversation;

storing said selected task progress status information;

updating said stored task progress status information, including by replacing noncurrent data with current data; and responding to an instruction activated by said user to select task progress status information from said stored information for transmission to a user display facility.

19. A method for processing a series of one or more DBMS statements in a computerized distributed database system having a requestor, having a server, having a communication link between the requestor and the server, and having a user terminal, comprising the steps of:

(a) establishing a storage block for storing information about the server and status of the DBMS statements;

(b) storing information about the server in the storage block;

(c) storing initial status information about a selected DBMS statement in the storage block;

(d) sending the selected DBMS statement to the server;

(e) receiving a responsive reply from the server;

(f) updating the status information about the selected DBMS statement in the storage block with information derived from the responsive reply, including by replacing noncurrent data with current data; and (g) repeating steps (c) through (f) for each DBMS statement in the series while responding to any inquiry command entered from the user terminal by displaying selected information from the storage block about the server and the selected DBMS statement.

20. The multiuser data processing system of claim 2 wherein said communication partner comprises a remote data processing or database system linked to the data processing system of said user.

21. The multiuser data processing system of claim 7 wherein said application requestor includes:

said update means;

said storage means; and said inquiry means.

22. The multiuser data processing system of claim 8 wherein said application requestor includes:

said update means;

said storage means; and said inquiry means.

23. A computer program product for use within a multiuser data processing system environment, comprising:

a computer usable medium having computer readable program code means embodied in said medium for providing an inquiry facility for a computerized data processing system, said computer program product having:

computer readable program code means for monitoring a conversation between a user of said data processing system, when a user program has been initiated to perform a task, and a communication partner associated with said data processing system;

computer readable program code means for selecting task progress status information from said conversation;

computer readable program code means for storing said selected task progress status information;

computer readable program code means for updating said stored task progress status information; including by replacing noncurrent data with current data; and computer readable program code means for responding to an instruction activated by said user to select task progress status information from said stored information for transmission to a user display facility.

24. A program storage device readable by a machine, tangibly embodying a program of instructions executable by the machine to perform method steps within a multiuser data processing system environment for providing an inquiry facility for a computerized data processing system, said method steps comprising at compile time:

monitoring a conversation between a user of said data processing system, when a user program has been initiated to perform a task, and a communication partner associated with said data processing system;

selecting task progress status information from said conversation;

storing said selected task progress status information;

updating said stored task progress status information, including by replacing noncurrent data with current data; and responding to an instruction activated by said user to select task progress status information from said stored information for transmission to a user display facility.

\* \* \* \* \*